(12) United States Patent
Farrugia et al.

(10) Patent No.: US 8,707,053 B2
(45) Date of Patent: Apr. 22, 2014

(54) PERFORMING BOOLEAN LOGIC OPERATIONS USING ARITHMETIC OPERATIONS BY CODE OBFUSCATION

(75) Inventors: Augustin J. Farrugia, Cupertino, CA (US); Benoit Chevallier-Mames, Paris (FR); Mathieu Ciet, Paris (FR); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 159 days.

(21) Appl. No.: 13/024,258

(22) Filed: Feb. 9, 2011

(65) Prior Publication Data

US 2012/0204038 A1 Aug. 9, 2012

(51) Int. Cl.
*G06F 12/14* (2006.01)

(52) U.S. Cl.
USPC ................................ 713/190; 380/38; 380/42

(58) Field of Classification Search
USPC ........................ 713/190; 380/38, 42
See application file for complete search history.

(56) References Cited

U.S. PATENT DOCUMENTS

| | | | |
|---|---|---|---|
| 5,081,675 A * | 1/1992 | Kittirutsunetorn | 713/190 |
| 6,668,325 B1 * | 12/2003 | Collberg et al. | 713/194 |
| 7,346,160 B2 * | 3/2008 | Michaelsen | 380/28 |
| 7,383,443 B2 * | 6/2008 | Zeman et al. | 713/190 |
| 7,430,670 B1 * | 9/2008 | Horning et al. | 713/190 |
| 7,587,616 B2 * | 9/2009 | Jakubowski | 713/190 |
| 7,917,716 B2 * | 3/2011 | Berenbaum et al. | 711/163 |
| 7,966,499 B2 * | 6/2011 | Kandanchatha et al. | 713/190 |
| 8,108,689 B2 * | 1/2012 | Nicolson et al. | 713/190 |
| 8,161,463 B2 * | 4/2012 | Johnson et al. | 717/136 |
| 8,176,337 B2 * | 5/2012 | Ciet et al. | 713/190 |
| 8,218,762 B2 * | 7/2012 | Itoh et al. | 380/46 |
| 2009/0086976 A1 * | 4/2009 | Scian | 380/277 |
| 2011/0176678 A1 * | 7/2011 | Choi et al. | 380/259 |

* cited by examiner

*Primary Examiner* — Amare F Tabor
(74) *Attorney, Agent, or Firm* — Adeli LLP

(57) ABSTRACT

Method and apparatus for obfuscating computer software code, to protect against reverse-engineering of the code. The obfuscation here is of the part of the code that performs a Boolean logic operation such as an exclusive OR on two (or more) data variables. In the obfuscated code, each of the two variables is first modified by applying to it a function which deconstructs the value of each of the variables, and then the exclusive OR operation is replaced by an arithmetic operation such as addition, subtraction, or multiplication, which is performed on the two deconstructed variables. The non-obfuscated result is recovered by applying a third function to the value generated by the arithmetic operation. This obfuscation is typically carried out by suitably annotating (modifying) the original source code.

26 Claims, 1 Drawing Sheet

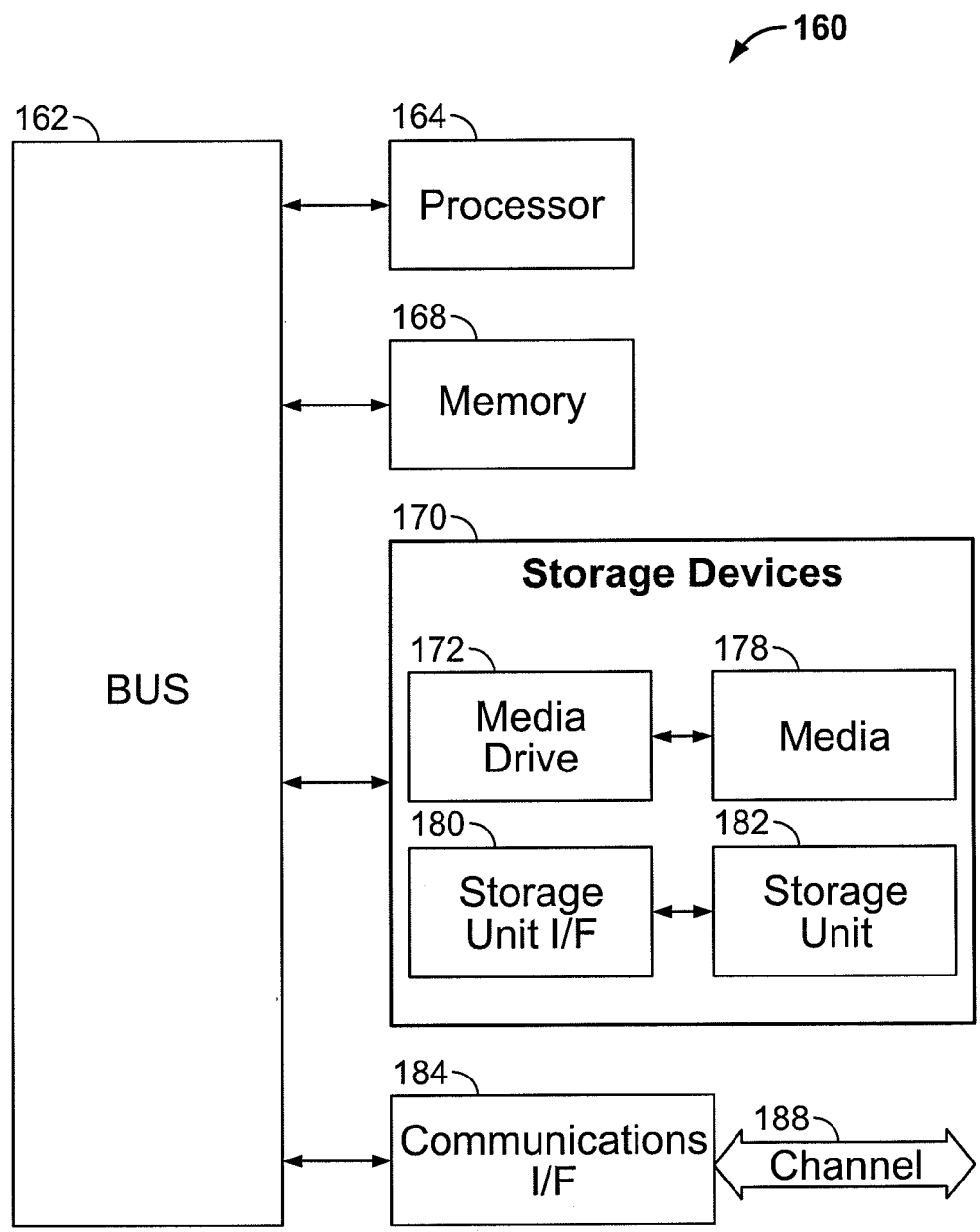

PERFORMING BOOLEAN LOGIC OPERATIONS USING ARITHMETIC OPERATIONS BY CODE OBFUSCATION

FIELD OF THE INVENTION

This invention relates to computers, more specifically to computer security, and even more specifically to preserving the security of computer software using code obfuscation.

BACKGROUND

The nature of computer software renders it susceptible to analysis and copying by third parties. There have been considerable efforts to enhance software security, see for instance U.S. Pat. No. 6,668,325 assigned to Intertrust Technologies Inc. There have been several efforts to provide technical protection for software. A well-known protection approach is called obfuscation, which typically relies on a rearrangement of the source code. Computer code (software or programs) comes in two chief types; the first is source code, which is as written by a human being (programmer) in a particular computer language. The source code itself is often then obfuscated. The other chief type is called object code or compiled code or binary code or machine code. This is the source code after having being processed by a special type of computer software program called a compiler; a compiler is routinely provided for each computer language. The compiler takes as input the alphanumeric character strings of the source code as written by the programmer, and processes them into a string of binary ones and zeros, which can then be operated on by a computer processor.

It is also known to obfuscate the compiled (object) code. The term "code morphing" is also applied to obfuscating object code. This is typically achieved by completely replacing a section of the object code with an entirely new block of object code that expects the same machine (computer or processor) state when it begins execution as a previous code section and will leave with the same machine state after execution as does the original code (thereby being semantically equivalent code). However, typically a number of additional operations compared to those of the original code will be completed, as well as some operations with an equivalent effect, by the morphed code. Code morphing makes disassembly or decompiling of such a program much more difficult. This is typically the act of taking the machine code and transforming it back into source code, and is done by reverse engineers or "hackers" who wish to penetrate the object code, using a special decompiler program. A drawback with code morphing is that by unnecessarily complicating operations and hindering compiler-made optimizations, the execution time of the obfuscated object code is increased. Thus typically code morphing is limited to critical portions of a program and so is often not used on the entire computer program application. Code morphing is also well known for obfuscating copy protection or other checks that a program makes to determine whether it is a valid, authentic installation or a pirated copy, for security purposes.

Therefore, typically the goal of obfuscation is to start with the original code and arrive at a second form of the code, which is semantically or logically equivalent from an input/output point of view. As pointed out above, this means that for any input to the code in the field of possible inputs, the output value of the code is the same for both the original code and the obfuscated code. Thus a requirement of successful obfuscation is to produce a semantically equivalent (but also protected) code to the original (unprotected) code.

As well known, computer programs called obfuscators or tools perform the obfuscating; they transform a particular software application (program) in source or object code form into one that is functionally identical to the original, but is much more difficult for a hacker to penetrate, that is to decompile. Note that the level of security from obfuscation depends on the sophistication of the transformations employed by the obfuscator, the power of the available deobfuscation algorithms as used by the hacker, and the amount of resources available to the hacker. The goal in obfuscating is to provide many orders of difference between the cost (difficulty) of obfuscating vs. deobfuscating.

Hence it is conventional that the obfuscation process is performed at one location or in one secure computer (machine) after the source code has been written. The obfuscated source code is compiled and then transferred to a second (insecure) computing device, where it is executed after installation in associated memory at the second computing device. (Note that the normal execution does not include any decompiling since there is no need on a machine-level basis to restore the source code. Decompiling is strictly done for reverse engineering purposes.) At the second (recipient) computing device, the obfuscated code is installed and then can be routinely executed by the processor at the second computing device. The obfuscated code is executed as is. Generally it is slower to execute than the original code.

Implementations of security related computer code running on "open platform" (insecure) systems are often subject to attack in order to recover cryptographic materials (keys, etc.), cryptographic algorithms, etc. The attacks are also referred to here by the term "reverse-engineering", which is the way to recover code internals from a software binary (object code). Open platform means that internal operations of the computing system are observable by an attacker. This also means that under some circumstances, the attacker can break into the computer programs, modify values, modify instructions, or inject code.

Several solutions are known to protect computer software code against reverse-engineering. They are implemented to make more complex the work of attackers in understanding the process, or to hide cryptographic data or operation.

In obfuscation, the code is typically re-written by a person referred to as a software developer (programmer) who reviews the source code and makes the necessary changes, or by using a software "tool" which does the same tasks as the developer, in a very complex way. Then an attacker must do substantial additional work to recover something (humanly) understandable from the object code. This obfuscation includes—for instance—re-writing loops, splitting basic blocs of instructions (adding a jump in the code, using predicates), flattening the control flow (not executing linear blocks of code), etc.

In the field of digital content protection, hiding data is necessary since it helps keep some values, and what the program is doing, unknown to an attacker. The goal of obfuscation is to create computer code as hard to understand as possible for an attacker. For instance, assume that one wants to hide in computer memory data designated D that is used with a Boolean exclusive OR operation (the XOR), with another value designated X. The problem is how to compute X XOR D, without revealing the value of D?

One known way to hide D, while computing X XOR D is:
Store D'=D XOR M1 in memory for a mask value M1,
Compute X'=X XOR M2 for a second mask value M2,
Compute Y'=X' XOR D' (this is equal to X XOR D XOR M1 XOR M2), Compute Y=Y' XOR (M1 XOR M2) (which by definition is equal to X XOR D).

It is assumed here that data (variables) X, D are expressed numerically, in binary (1's and 0's) form.

The variables M1 and M2 are used to mask (hide) the values of D and X in the memory; an attacker who retrieves D' in memory has to find M1 to retrieve D. Furthermore, the value D' may have been computed on a safe (secure) server not accessible to the attacker, such that it looks complicated to recover D and M1.

However, this method has drawbacks:

1. It is easy to retrieve the mask variables from several pairs (D, D') of masked/unmasked data. Indeed, if an attacker is able to obtain a single data pair (D, D'), he can retrieve mask M1 by computing:

$$M1 = D\ XOR\ D'$$

Unmasking any other masked data (having the same mask value) is then easy.

2. The mask value M1 can be computed from data in the code, since M2 and (M1 XOR M2) must appear in the code in order to mask X and to unmask Y'.

Note that in practice, the attack is not so easy, since implementation of this is done in a complex way with split data, fake operations, and it is not so easy in the middle of many operations to retrieve the useful (for the attacker) elements.

SUMMARY

In accordance with the invention, an obfuscation technique is provided for computer source code. The original source code is modified by an obfuscation process applied by a software developer who reviews the code and modifies it, or does so by using a suitable tool. Thus rather than installing or downloading the original compiled code, instead the resulting obfuscated source code is compiled then downloaded or installed in the second (recipient) computer or computing device. Of course, computing devices here include for instance mobile telephones, cable television set top boxes, personal computers, laptop computers, personal digital assists, etc. The code cannot be, and so is not, deobfuscated at execution since that would degrade its security. As well known, there exist many programs semantically equivalent to the original code. They normally are not identical; that is what is meant by semantically or logically equivalent. Then this equivalent object code, which is executable, is installed on the recipient (target) device.

The present methods are a way of masking data involved in an XOR or other Boolean logic operation. Notably the methods (i) compute an XOR using an arithmetic operation, with masked values; (ii) use masking techniques such that even if there are some known data pairs (D, D'), i.e. masked and unmasked data values, an attacker cannot unmask a new data value; (iii) are such that two data pieces D and X are masked differently, and use an unmasking technique that does not work on X' or D', but only on a combination of them.

Described here is the operation of the tool to create the obfuscated code, the associated obfuscating method (which may be performed by a person manually without use of the tool if desired) applied to the code, and also the method of executing the resulting obfuscated code.

These methods can be combined with other techniques known for obfuscating computer code, both source code and object code.

BRIEF DESCRIPTION OF THE FIGURE

FIG. 1 shows a conventional computing device used in accordance with the invention.

DETAILED DESCRIPTION

The goal of the present method is to solve the above described technical problems. Instead of masking data with a Boolean mask (e.g., an XOR applied mask), the data is masked with a function designated here f, such that $$D'=f(D).$$

In addition, two functions designated here g and h are provided that are linked (as explained below) to f, as well as a binary operator "op" (e.g., the arithmetic operations +, −, *, ... ). The present disclosure describes functions f, g and h and op, used in order to compute X XOR D (or any other Boolean logic operation combining X and D), with the masked value D'=f(D) stored in memory.

More generally, the present method is not limited to substituting for the Boolean logic exclusive OR operation, but may be used to substitute for the Boolean NOR and OR operations. The data designated X and D here may be, where the application program being obfuscated is a cryptographic process, a cryptographic key (or a byte of a key) and an associated portion (e.g. a byte) of plaintext or ciphertext data to which the key is applied. Typical such cryptographic processes are encryption and decryption.

The obfuscation method uses the following steps (where the notation is as above):

1. Compute X'=g(X)
2. Compute Y'=X' op D'
3. Compute Y=h(Y'), where h is the recovering function Thereby:

1. f is a function that masks the secret data D.
2. g is a function that masks the value X.
3. op is a way to compute the XOR of X' and Y', which are X and Y in masked form.
4. h is a function to unmask the previously computed result Y', to recover Y.

Protected computer code that has this obfuscation includes the code for the functions g and h, but not necessarily for function f. Indeed, masked data D' may instead (in a client-server computer network environment) be computed on the (secure) server side to, or during code execution at a previous initialization time, or at the source code compilation time before execution (which is even more secure). It is understood that the remainder of the code is usually executed on the (insecure) client.

Advantages are:

1. Even given a data pair (D, D'), it is not possible to retrieve function f.

With the known XOR-mask solution, a single pair (D, D') of clear data, masked data allows recovery of the mask M1 and so allows an attacker to break the obfuscation. Here, even if several such pairs (D, D') are known, it is difficult for the attacker to obtain the clear value of another masked value E' (with E' different from all D').

2. From the obfuscated code, it is not possible to compute $f^1$ (the inverse of function f, i.e. the function $f^1(y)$ that returns x such that y=f(x)), unless one possesses D'=f(D) for all the different values of D. This is why it is preferred not to do this at runtime (code execution time), except if done at a previous initialization time.

In this case, the attacker needs to execute, for each of these data values D', the XOR computation as described above, with functions g and h, to obtain all the data pairs (D, D') and to obtain the function f as a table. Contrary to the known simple Boolean mask approach, this is more difficult for the attacker when he wants to compute the plain (clear) data D or X, since functions g and h are also protected.

In general for better security, functions g and h are not accessible at the same time or at the same place in the obfuscated code. At some points, the input of function g is masked and the code for function g contains internally this mask that has to be found by the attacker. For instance, it may not be necessary to recover Y from Y' immediately, but other portions of the code may operate directly on Y'. Thereby function h may not be closely associated in the code with functions f and g. At other points, the output of function h is directly masked and computed with this later. Also note that both inputs and outputs can be masked, which makes it even more difficult for the attacker if he cannot rely on the exact values of g or/and h.

The following describes functions f, g, and h, and operator op. This disclosure assumes the data is in pieces which are bytes (8 bits), but this is readily generalized to any word size (data length).

Implementing an XOR with an Addition

In a first embodiment of the present method function f is equal to function g.

Function f: It is well known that any numeric data D can be uniquely represented in arithmetic (unsigned) base 2 as follows:

$$D = \Sigma di 2^i \text{ where } di \text{ are the bits representing } D \text{ (where each } di=0 \text{ or } 1)$$

$\Sigma$ denotes the sum from 0 to "some value" over the index i; i.e. $D = d0 + 2*d1 + 4*d2 + \ldots$ For example, 7 is (1, 1, 1) in base 2, and 13 is (1, 1, 0, 1) in base 2.

Keeping the same di, construct D' from D (and denote this operation $f(\cdot)$) as follows:

$$D' = \Sigma di 3^i = f(D)$$

E.g., $f(7) = 1*3^2 + 1*3 + 1 = 13$ in base 10, and $f(13) = 1*3^3 + 1*3^2 + 0*3 + 1 = 37$ in base 10.

Function f is an injective function, i.e. it can be inverted for its images. So for a given value $y = f(x)$, one can efficiently compute the unique x.

Operation op: Next, the code computes D XOR X, using $D' = f(D)$ and $X' = f(X)$. In this example, arithmetic addition is the "op" operation referred to above.

One has:

$$D' op X' = D' + X' = \Sigma(di + xi) 3^i$$

Since di and xi are each in the set {0, 1}, then (di+xi) is in the set {0,1, 2}. So there is no possible arithmetic carry when computing (di+xi) in base 3. As there is no carry, given $\Sigma(di+xi) 3^i$, one can recover the different (di+xi) values, and consequently, the different ((di+xi) % 2) values, where "%" is the modulus operation. (Note that the XOR operation is an addition with no carry.)

Function h: Thus, compute function h defined by:

$$h(a) := \text{write } a \text{ as } \Sigma ai 3^i, \text{ and return } \Sigma(ai \% 2) 2^i$$

and see that:

$$D \text{ XOR } X = h(D' + X')$$

This computation can be implemented in the protected code by a table lookup.

To summarize, in the obfuscated code the following steps compute (substitute for) D XOR X in the original code:

1. D'=f(D)
2. X'=f(X)
3. Y'=D'+X'
4. Y=h(Y')

These steps implement an XOR Boolean logic operation by an arithmetic addition. It also has the security that even if several data pairs (D, D') are known, the attacker is not able to unmask a new value D' unless he knows obfuscation the techniques used.

Generalization to other bases. One skilled in the art will understand that in other embodiments this is generalized to other arithmetic bases. E.g., define (for arithmetic base 5):

$$D' = \Sigma di 5^i = f(D)$$

and $$h(a) := \text{write } a \text{ as } \Sigma ai 5^i, \text{ and return } \Sigma(ai \% 2) 2^i.$$

Yet another embodiment uses a different arithmetic base, i.e. not only 3, for each bit. In fact, any number larger than 3 may be used as a base for any one bit. E.g., with respective bit bases 5, 7, 3, 4, 5, 6, 8, one computes:

$$D' = d0 + 8*d1 + 8*6*d2 + 8*6*5*d3 + 8*6*5*4*d4 + 8*6*5*4*3*d5 + 8*6*5*4*3*7*d6 + 8*6*5*4*3*7*5*d7 = f(D)$$

and $$h(a) := \text{write } a \text{ as } (a0 + 8*a1 + 8*6*a2 + 8*6*5*a3 + 8*6*5*4*a4 + 8*6*5*4*3*a5 + 8*6*5*4*3*7*a6 + 8*6*6*4*3*7*5*a7), \text{ and return } \Sigma(ai \% 2) 2^i.$$

This is more secure (since it is more complex) than using one base value for all data bits. Again, this calculation can be implemented in the protected (obfuscated) code as a table lookup.

Implementing an XOR by Multiplication

Let $a^x$ be the power operator, i.e. $a*a*a \ldots *a$ x times.

The function f: Let pi be a set of 4 relatively small prime numbers, e.g. the prime number set {2,3,5,7}. One can represent any 4-bit number x as $$X' = f(x) = (p0^{x0}) * (p1^{x1}) * (p2^{x2}) * (p3^{x3}).$$

The operator op: If one has $D' = f(D)$ and $X' = f(X)$, compute:

$$X' * D'$$

and in fact, this is $(p0^{x0+d0}) * (p1^{x1+d1}) * (p2^{x2+d2}) * (p3^{x3+d3})$, where the values (d0,d1,d2,d3) are the bits of D, and (x0,x1, x2,x3) are the bits of X. If this operation is performed on sufficiently large data words, there is no collision of values, since the decomposition into prime factors is unique. So this is an injective function. More precisely, one needs to have data words expressed as $(p0*p1*p2*p3)^2$. E.g., for the set P{2,3,5,7}, this is $210^2 = 44100$, so data words of 16 bits are adequate for good security.

Function h: So it is possible to use the following recovery function h:

$$h(a) := \text{decompose } a \text{ into prime factors: } (p0^{a0}) * (p1^{a1}) * (p2^{a2}) * (p3^{a3}) \text{ and return } \Sigma(ai \% 2) 2^i.$$

Function h can be implemented in the protected code as a table lookup. The reason to use relatively small primes is to keep the size of the table manageable.

To summarize, in this embodiment the following steps compute D XOR X, where D and X are each data nibbles (i.e., 4 bits):

1. D'=f(D)
2. X'=f(X)
3. Y'=D'*X'
4. Y=h(Y')

This embodiment implements an XOR logical operation with an arithmetic multiplication. It also has the protection that even if data pairs (D, D') are known, the attacker is not able to unmask a new value D'.

Generalization. Other embodiments are extensions of this method. One embodiment uses direct prime numbers (the smaller they are, the smallest the h table can be). Another embodiment puts more than one bit of x into a prime number p, e.g. use $$X'=f(x)=(p0^{x0+2*x1})*(p1^{x2+2*x3})*(p2^{x4+2*x5})*(p3^{x6+2*x7}).$$

and $$h(a):=\text{decompose } a \text{ into } (p0^{a0+2*a1})*(p1^{a2+2*a3})*(p2^{a4+2*a5})*(p3^{a6+2*a7}), \text{ and return } \Sigma(ai \% 2)2^i.$$

It may be possible to replace the op (*) operation by a modular multiplication, i.e., op: (D'*X') % N for some value N. One just needs to select a prime number p and value N such that all combinations are unique.

Use with Other Techniques

These embodiments are compatible with other known data hiding approaches, to improve effectiveness in further embodiment. Notably, one may:

1. Randomize the order of the data bits before computing the functions f or g, and after computing the functions,
2. Permute values before or after computing the functions. For instance, one can use affine functions A: x→(ax+b) % c to mask the function f and g outputs and the function h inputs in the case of the addition operation. In the case of the multiplication operation, linear functions L: x→ax % c can be used.
3. Add randomness, i.e. pad the data that is input to some tables or functions with random bit values, and ignore the resulting bits from the padding bits.

Yet another embodiment, instead of the addition operation for OP uses the arithmetic subtraction operation.

However security of these embodiments is not perfect. Indeed, for any data value D, h(f(D))=D. So, using h on X' directly, an attacker may recover the hidden value D. Furthermore, the function f applied on D and X is the same (i.e., f is equal to g). It is more secure to have differences between hiding X and D.

Making Functions f and g Different

Consider the above embodiment using the addition operation. (The same could be done for the embodiment using the multiplication operations.)

A first embodiment, with offsets: Let ui be 8 integer offset values (if x is a byte having 8 bits) and define:

$$f(x): \text{write } x \text{ as } \Sigma xi2^i, \text{ and return } f(x)=\Sigma(xi+ui)5^i$$

An extension to other numbers of bits is straightforward. Let vi be 8 integer offset values and define:

$$g(x): \text{write } x \text{ as } \Sigma xi2^i, \text{ and return } g(x)=\Sigma(xi+vi)5^i$$

The requirement is that ui+vi<3 and ui≥0 and vi≥0, such that when one adds the two values xi, the sum is less than 5, i.e. there is no arithmetic carry in base 5.

Function h: Thus compute function h defined by:

$$h(a):=\text{write } a \text{ as } \Sigma(ai)5^i, \text{ compute } bi=ai-ui-vi, \text{ and return } \Sigma(bi \% 2)2^i$$

h can be implemented by a table lookup.

To summarize, in this embodiment the following steps compute D XOR X, as above:

1. D'=f(D)
2. X'=g(X)
3. Y'=D'+X'
4. Y=h(Y')

This embodiment implements an XOR logical operation using an addition. The advantage is that f and g are different, and that h cannot be used to invert f, i.e., h(D') is not equal to D.

Multiple Functions

Instead of offsets ui and vi, yet another embodiment uses any function from [0,1] to [0,5]. Suppose there are 8 such functions designated si( ) and ti( ) where si and ti are functions from [0, 1] to [0, 5] (one function for each of eight bits of data) so that:

$$f(x): \text{write } x \text{ as } \Sigma xi2^i \text{ and return } f(x)=\Sigma(si(xi))5^i$$

Define $g(x)$: write $x$ as $\Sigma xi2^i$ and return $g(x)=\Sigma(ti(xi))5^i$

It is required that, for all i, for all xi and yi, the function $(xi,yi) \to si(xi)+ti(yi)$ is injective. Thus there exists an inverse to this function, called w( ). This means that w(si(xi)+ti(yi))=(xi, yi). Such a set {si, ti, w} is called here a compatible set.

Function h: Thus compute function h defined by:

$$h(a):=\text{write } a \text{ as } \Sigma(ai)5^i, \text{ compute } (xi,yi)=w(a), \text{ and return } \Sigma((xi+yi) \% 2)2^i, \text{ where } h \text{ can be implemented by a table lookup.}$$

To summarize, the following steps compute D XOR X in this embodiment, as above:

1. D'=f(D)
2. X'=g(X)
3. Y'=D'+X'
4. Y=h(Y')

This implements an XOR logical operation using an addition. The advantage here is that f and g are different, and that h cannot be used to invert f, i.e., h(D') is not equal to D. Further compared to the previous embodiment, the functions f and g are more complex and harder to break, i.e. it is complicated to recover the set (si, ti, w).

This embodiment with functions si and ti can be used with different arithmetic bases, not only base 5, as is explained above.

Other embodiments are similar but use as the op multiplication. Others use different arithmetic bases (see above). Others use randomness, i.e. make some bits of D or D' useless (key padding), to introduce uncertainty in the computations.

One may also combine these embodiments with conventional Boolean data masks. Notably, this can be done on table lookup inputs and table lookup outputs. All embodiments may be generalized to XOR(or other logic) operations of more than 2 variables. Such operations are for instance used in the well known AES cipher for the mix column operation.

FIG. 1 shows in a block diagram relevant portions of a computing device (system) in accordance with the invention for carrying out the present processes. This is, e.g., a computer, server, or part of such a device and includes conventional hardware components executing in one embodiment software (computer code) embodying the above examples of a code protection process. This code may be, e.g., in the C or C++ computer language or its functionality may be expressed in the form of firmware or hardware (circuitry) logic; writing such code or designing such logic would be routine in light of the above disclosure.

Use of the obfuscating tool (which is written in any convenient computer language such as C or C++, and need not be in the same language as the code to be obfuscated), is as follows: First, the original source code to be obfuscated is input to the tool, to produce ("annotate") the obfuscated source code as described above or, if no tool is used, the software developer does this manually by modifying the source code as described above. Then this obfuscated source code is conventionally compiled into object code. Generally, obfuscation of the code is followed by the code compilation, or the obfuscation is of code in an intermediate computer program language, but the compilation is still after the obfuscation. Then the obfuscated object code is conventionally distributed to users, such as in the form of an application program. From the user's standpoint, the obfuscated object code functions identically when executed on his computing platform to the original source code.

Computer code in terms of the above described developer's obfuscating tool (if used) and the (conventional) compiler is conventionally stored in memory (computer readable storage medium, e.g., RAM or ROM) associated with a processor for in, a computing system, execution by the processor. The incoming source code to be protected is received at a port of the computing system and stored in a computer readable storage medium (memory, e.g., RAM) where it is coupled to the processor. The processor conventionally partitions the code into suitable sized blocks at a partitioning module. Other software (code) modules in the tool which are executed by the processor may carry out the obfuscation functionality set forth above.

FIG. 1 thus illustrates a typical and conventional computing system 160 that may be employed to implement processing functionality in embodiments of the invention for (1) protecting (obfuscating) the code as described above or (2) executing the protected code (which is conventional in terms of the code execution). Computing systems of this type may be used in a computer server or user (client) computer in a computer network or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor. Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168, such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184. Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of protecting computer program code, the method performed by an electronic device, the method comprising:

at the electronic device, receiving a file of computer program source code that includes a particular logic operation that takes as input first and second pieces of data, wherein the logical operation, when executed, generates an output data from the first and second pieces of data;

replacing the particular logic operation with a set of functions, the set of functions comprising:

a first function for masking the first piece of data by performing deconstruction of the first piece of data, wherein each bit of the first piece of data is deconstructed by a different base value;

a second function for masking the second piece of data by performing a bitwise-deconstruction of the second piece of data, wherein each bit of the second piece of data is deconstructed by a different base value;

a binary operator that computes a masked value by applying a binary code equivalent of the particular logic operation to the masked first piece of data and the masked second piece of data; and a recovery function that requires an input of the masked value and generates as an output the output data that the particular logic operation would generate from the first and second pieces of data.

2. The method of claim 1, wherein the particular logic operation is one of an OR, NOR, and XOR.

3. The method of claim 1, wherein the binary code equivalent of the particular logic operation is one of addition, multiplication, and subtraction.

4. The method of claim 1, wherein the first and second functions are the same.

5. The method of claim 1, further comprising, after the replacement of the particular logic operation, compiling the source code.

6. The method of claim 1, wherein the protected code is functionally equivalent but not semantically identical to the source code prior to protection.

7. The method of claim 1, wherein each of the first and second functions is expressed as a table lookup.

8. The method of claim 1, wherein each of the first and second functions applies a plurality of integer offset values on a bit-wise basis.

9. The method of claim 1, wherein each of the first and second functions applies a plurality of offset functions on a bit-wise basis.

10. A non-transitory machine readable medium storing a program which when executed by at least one processing unit protects computer program code, the program comprising sets of instructions for:

receiving a file of computer program source code that includes a particular logic operation that takes as input first and second pieces of data, wherein the logical operation, when executed, generates an output data from the first and second pieces of data;

replacing the particular logic operation with a particular set of instructions that define a set of functions, the set of functions comprising:

a first function for masking the first piece of data by performing deconstruction of the first piece of data, wherein each bit of the first piece of data is deconstructed by a first base value;

a second function for masking the second piece of data by performing a bitwise-deconstruction of the second piece of data, wherein each bit of the second piece of data is deconstructed by a second base value;

a binary operator that computes a masked value by applying a binary code equivalent of the particular logic operation to the masked first piece of data and the masked second piece of data; and a recovery function that requires an input of the masked value and generates as an output the output data that the particular logic operation would generate from the first and second pieces of data.

11. The non-transitory machine readable medium of claim 10, wherein the particular logic operation is one of an OR, NOR, and XOR.

12. The non-transitory machine readable medium of claim 10, wherein the binary code equivalent of the particular logic operation is one of addition, multiplication, and subtraction.

13. The non-transitory machine readable medium of claim 10, wherein the first and second functions are the same.

14. The non-transitory machine readable medium of claim 10, wherein the first and second functions perform a bit-wise deconstruction of the pieces of data.

15. The non-transitory machine readable medium of claim 10, wherein the program further comprises a set of instructions for compiling, after the replacement of the particular logic operation with the particular set of instructions, the computer program source code into object code.

16. The non-transitory machine readable medium of claim 10, wherein the set of instructions for replacing the particular logic operation is executed as a part of another set of instruction for compiling the computer program source code.

17. The non-transitory machine readable medium of claim 10, wherein the first and second base values are the same.

18. The non-transitory machine readable medium of claim 10, wherein the first and second base values are different.

19. The non-transitory machine readable medium of claim 10, wherein each of the first and second functions is expressed as a table lookup.

20. The non-transitory machine readable medium of claim 10, wherein each of the first and second functions applies a plurality of integer offset values on a bit-wise basis.

21. The non-transitory machine readable medium of claim 10, wherein each of the first and second functions applies a plurality of offset functions on a bit-wise basis.

22. A system comprising:

a set of processing units for executing sets of instructions;

a memory for storing a program which when executed by at least one of the processing units protects data involved in an operation with a plurality of input values performed in computer program source code, the program comprising sets of instructions for:

individually masking each input value to the operation with a different mask by performing a bitwise-deconstruction of the input values, wherein each bit of each input value is deconstructed by a base value, wherein knowledge of less than all possible values for both masked and unmasked input values is insufficient to reveal the remaining input values, and wherein the operation has been replaced with one or more functions applied to the masked input values; and unmasking the masked result of the one or more functions with a recovery operation that requires an input of each individually masked input value used to compute the masked result.

23. The system of claim 22, wherein each different mask is an injective function.

24. The system of claim 22, wherein the one or more functions comprises a binary operator for performing the operation using arithmetic on the individually masked input values.

25. The system of claim 22, wherein the one or more functions comprises a binary operator for performing the operation using multiplication on the individually masked input values.

26. The system of claim 22, wherein the operation is one of the following Boolean logic operations: OR, NOR, and XOR.

* * * * *